Feb. 16, 1971 L. MILLER ET AL 3,564,429

PROGRAMMABLE RATE OSCILLATOR

Filed Feb. 5, 1969 2 Sheets-Sheet 1

INVENTOR
W. J. SCHULTZ
LAWRENCE MILLER
CLARENCE W. PADGETT
WILEY T. RUHL, JR.

BY H. H. Losch

ATTORNEY

INVENTOR
W. J. SCHULTZ
LAWRENCE MILLER
CLARENCE W. PADGETT
WILEY T. RUHL, JR.
BY H. H. Losch
ATTORNEY 3,564,429

PROGRAMMABLE RATE OSCILLATOR

Lawrence Miller, Anaheim, Clarence W. Padgett, Buena Park, Wiley T. Ruhl, Jr., Westminster, and Walter J. Schultz, Yorba Linda, Calif., assignors to the United States of America as represented by the Secretary of the Navy Filed Feb. 5, 1969, Ser. No. 796,668
Int. Cl. H03k 5/00
U.S. Cl. 328—129 8 Claims

ABSTRACT OF THE DISCLOSURE

A programmable rate oscillator having a metal oxide semiconductor (MOS) recirculating shift register type counter coupled to a digital comparator to which is also coupled a programmed digital input time delay to switch a bistable multivibrator at the beginning of each count and again at the digital equality of the programmed digital input with the shift register accumulation in a data sampled sequence to produce a one-shot output delay in accordance with the programmed input time delay with means connected in association therewith to indicate valid and invalid data samples.

BACKGROUND OF THE INVENTION

This invention relates to programmable rate oscillators and more particularly to a programmable delay digital one-shot MOS multivibrator large scale integration (LSI) circuit using two-phase clocking technique to read in and read out digital information in a recirculating shift register for comparison with a digital program.

Prior known devices usually use monostable multivibrators with gated pulse means to vary the time interval of holding the multivibrator in one state. Other devices employ cascaded gated monostable multivibrators sequenced and controlled by counter circuits. Sometimes pulse forming circuits were used to obtain voltage pulses of variable width. While these circuits were of solid state and small, the problem still exists, with the ever increasing equipment loads in aircraft, to reduce electronic gear to the bare minimum.

SUMMARY OF THE INVENTION

In the present invention a digital one-shot counter device is used which is fabricated on a single silicon die from MOS solid state devices forming the recirculating shift register. By using a recirculating shift register type counter instead of a conventional type counter utilizing multivibrators, the digital one-shot is more easily integrated as a MOS LSI circuit. When using a recirculating shift register of *n*-bits, a "1" can be added to the contents of the shift register each time the shift register shifts *n* bits, or one recirculation. This is desirable for generating long delay times. Using a shift register with many bits or using a low frequency clock is also desirable for generating long delay times. The invention also utilizes a four-state counter to sample related data samples on its input through three cycles to determine whether the data samples are valid or invalid. These data samples are sampled in synchronism with the sync pulses applied to the shift register. It is therefore a general object of this invention to provide a one-shot rate oscillator that is programmable to produce a precise and accurate pulse delay to make it possible to sample data channels at different sampling rates from about 500 microseconds to 0.5 second with a time stability of 1%.

BRIEF DESCRIPTION OF THE DRAWINGS

These and other objects and the attendant advantages, features, and uses will become more apparent to those skilled in the art as a more detailed description proceeds when considered along with the accompanying drawings, in which.

DESCRIPTION OF THE PREFERRED EMBODIMENT

Figure 1:
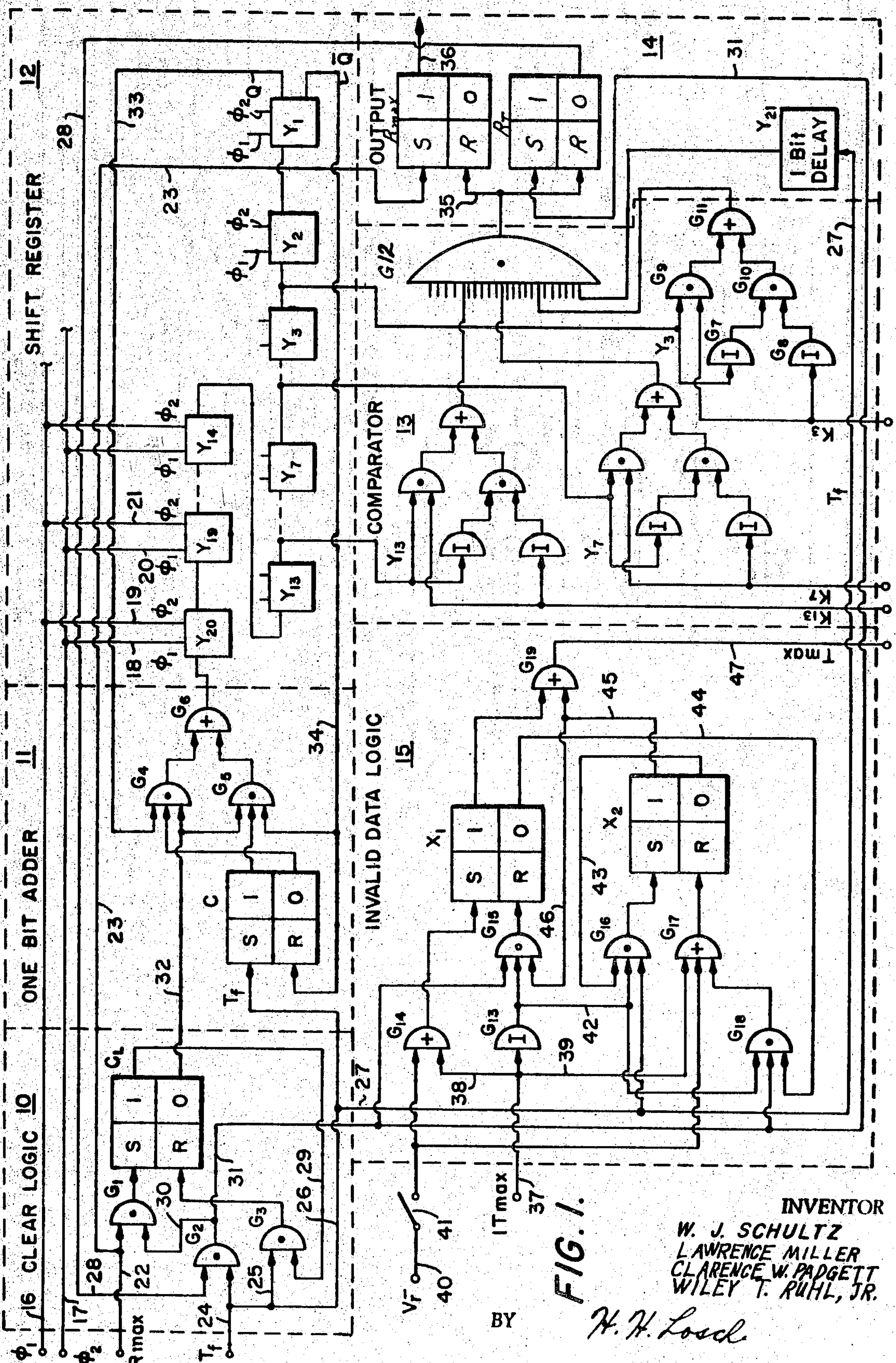
FIG. 1 is a block circuit schematic diagram of the programmable rate oscillator.
Figure 2:
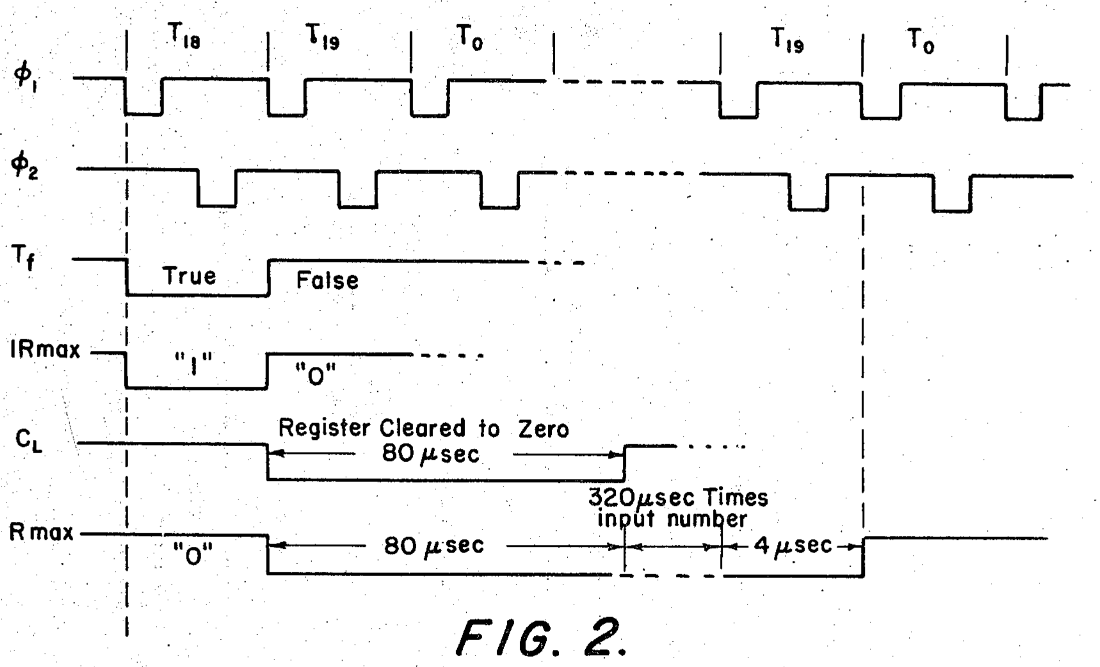
FIG. 2 is an illustration of the various waveform inputs and outputs to the circuit of FIG. 1.

Referring more particularly to FIG. 1, with occasional reference to FIG. 2, there is shown a circuit schematic diagram of the programmable rate oscillator consisting of the components set off in broken lines as a clear logic component 10, a one-bit adder 11, a shift register 12, a comparator 13, an output circuit 14, and an invalid data logic circuit 15. The clear logic 10 and one-bit adder 11 components may be considered as a control and timing circuit for the remaining components. The clear logic circuit 10 consists of a bistable multivibrator CL and three AND gates G1, G2, and G3. The one-bit adder 11 consists of a bistable multivibrator C, two AND gates G4 and G5, and an OR gate G6. The shift register 12 consists of a plurality of one-bit delay MOS circuits herein identified to be Y1 through Y20. Each delay bit Y1 through Y20 has two phase clock pulses applied thereto identified as $\phi 1$, $\phi 2$ as will hereinafter be more fully described. This MOS shift register is a recirculating type shift register in which all bits are coupled for recirculating count with the exception of Y1 having two outputs Q and $\overline{Q}$. Comparator 13 consists of an output AND gate G12 receiving inputs from a plurality of AND and OR circuits, only one group for one digit being described herein, this being for the third digit or Y3 digit of the register. This Y3 unit includes inverters G7 and G8, two AND gates G9 and G10, and an OR gate G11 coupled as an input to the output AND gate G12. A second set of inputs to the inverter and gating circuits is applied to a terminal for the letter K3 which is applied to one inverter G8 and one AND gate G9 while the Y3 input is one input to the gate G9 and the inverter G7. All Y inputs and K inputs are thus applied to the corresponding bit in the comparator 13 for the production of the voltage output to the AND gate G12. The output circuit 14 consists of two bistable multivibrators identified by $R_{max}$ and $R_t$, the output of the circuit being taken from the $R_{max}$ bistable multivibrator. The invalid data logic circuit 15 consists of a four-state X counter identified by X1 and X2, an inverter G13, two OR gates G14 and G17, and three AND gates G15, G16, and G18. In the description of the device in FIG. 1 a "true" logic level will be defined as a negative voltage. Zero volts, or ground, is defined as a false logic level. In this device the logic signals will set or reset the multivibrators when the clock pulse $\phi 2$ is negative or "true" while the flip-flop output changes state when $\phi 1$ is true. The clock "true" times of the two phases do not overlap as may be realized from FIG. 2. The shift register 12 is clocked in during the time $\phi 2$ is "true" and the register output changes state during the time $\phi 1$ is "true."

The inputs to the clear logic circuit 10 for the $\phi 1$ and $\phi 2$ clock pulses are applied by conductors 16 and 17 with branch conductors 18 and 19 connected to the Y20 delay bit in the shift register 12 and by branch conductors 20 and 21 to the Y19 delay bit in the shift register 12. In like manner branch conductors connect the $\phi 1$ and $\phi 2$ clock pulses to all the Y delay bits in shift register 12 although these are not shown to preserve clarity in the drawing. The $1R_{max}$ start pulse is applied by way of conductor 22 to the AND gate G1 and is also connected by branch conductor 23 to the set terminal of the $R_{max}$ multivibrator in the output circuit 14. The sync pulse $T_f$ is applied by way of conductor 24 to the AND gate G2, by a branch conductor 25 to the AND gate G3, and also by branch conductor 26 to the set terminal of the C multivibrator in the one bit-adder 11 as well as by branch conductor 27 to G16 and also through the one-bit delay Y21 to an input terminal of the output AND gate G12 in comparator 13. As a second input to AND gate G2 in the clear logic component 10 is the "0" output of the multivibrator $R_t$ in the output circuit 14 by way of conductor means 28. A second input to the AND gate G3 in the clear logic component 10 is from the "1" output of the multivibrator CL by way of conductor means 29. The output of AND gate G1 is to the set terminal of CL while the output of AND gate G3 is to the reset terminal of CL. The output of AND gate G2 is by way of conductor 30 applied as a second input to AND gate G1 and by branch conductor 31 as one input to AND gate G15 and to AND gate G18, in the invalid data logic component 15. This branch circuit 31 is also coupled to the set terminal of the multivibrator $R_t$ in the output circuit 14.

The one-bit adder 11 has the "0" output of the multivibrator CL coupled by the conductor 32 as one input in common to AND gates G4 and G5. The "1" output from the multivibrator C is coupled as an input to the AND gate G5 while the "0" output of multivibrator C is coupled as an input to AND gate G4. The Q output of the Y1 delay bit in the shift register 12 is coupled by way of the conductor means 33 to AND gate G4 while the $\overline{Q}$ output of the delay bit Y1 is coupled by conductor 34 as an input to AND gate G5 and also to the reset terminal of the multivibrator C. The output of each AND gate G4 and G5 is coupled as an input to the OR gate G6, the output of which is to the first delay bit Y20 in the shift register 12.

In the comparator 13 all the K inputs, only three of which are shown herein as being K3, K7, and K13 for purpose of example, are applied as a word preset for the desirable delay of the $R_{max}$ output for the conditions required. While only three of these K inputs are shown and only three comparator groups are shown, as G7 through G11, it is to be understood that there can be as many as there are delay bits in the shift register 12. Referring to the K3 and Y3 bits, K3 is applied in common to the inverter G8 and to the AND gate G9 while the Y3 bit is applied to the AND gate G9 and to the inverter G7. The output of the inverters G7 and G8 are applied to the AND gate G10, the output of which is to the OR gate G11. The output of AND gate G9 is also coupled to OR gate G11 and the output of this OR gate G11 is applied as one input to the output AND gate G12. Each of the corresponding K and Y bits are coupled as shown for the K3 and Y3 bits, the output of each being applied to the output AND gate G12. In practice the number of stages in the digital comparator 12 can be equal to or less than the number of stages in the counter depending upon the specific application. The least significant bits of the counter may not have to be monitored in some applications. Ignoring the least significant bits in the counter for register 12 is equivalent to making each of these bits a logical zero. Ignoring the least significant bits of the register 12 does not sacrifice delay time accuracy or stabilization. It simply means there are some specific delay times which are not programmable. It is desirable to minimize the number of stages in the digital comparator 13 and thus the number of bits in the programmed input number K, in order to reduce circuit complexity, power dissipation, and the number of leads on the integrated circuit (IC) package. The one-bit delay Y21 has the $T_f$ sync signal applied thereto over conductor 27 with the output applied as one input to the output AND gate G12. This produces AND gate G12 sampling once each time of occurrence of the sync pulse delayed one bit to allow time for logic circuit comparison in the comparator 13.

The output circuit 14 receives the output from AND gate G12 in common by way of conductor means 35 to each reset terminal of the $R_{max}$ multivibrator and the $R_t$ multivibrator. The "1" output of the $R_{max}$ multivibrator is by way of conductor 36 being the output of the programmable rate oscillator. Accordingly, the negative pulse or waveform in the $R_{max}$ line as shown in FIG. 2 constitutes the programmed delay which is desired on the output of this circuit.

The invalid data logic circuit 15 receives signals identified by $1T_{max}$, these signals being false or zero for invalid indication and a negative voltage or "true" signal for a valid indication. This $1T_{max}$ signal is applied by way of the conductor means 37 as an input to the inverter G13, the output of which is in common to AND gates G15 and G16. The conductor 37 has branch conductors 38 and 39 applied as inputs to the OR gate G14 and the OR gate G17. The output of OR gate 14 is coupled to the set terminal of the X1 multivibrator while the output of the OR gate G17 is to the reset terminal of the X2 multivibrator. A second input to the invalid data logic circuit is from a negative voltage source $V_r$ by way of conductor means 40 through a switch 41 operable by the pilot or other operator of this circuit as a second input to the OR gate G14 and OR gate G17. The output of the inverter G13 is coupled by branch conductors 42 as inputs to AND gate G15, to AND gate G16, and to AND gate G18. The "0" output of multivibrator X2 is coupled by way of conductor means 43 as the third input to AND gate G16 while the "0" output of multivibrator X1 is coupled by the conductor means 44 as a third input to AND gate G18. The "1" output of multivibrator X1 is coupled as one input to an OR gate G19 while the "1" output of the multivibrator X2 is coupled by the conductor means 45 as the second input to OR gate G19 and by the branch conductor 46 as the third input to the AND gate G15. The output of the OR gate G19 is by way of the conductor means 47 conducting the $T_{max}$ output which remains in its "1" or "true" state as long as the input signals on $1T_{max}$ are valid or "true." $T_{max}$ will go to its false or zero state after three samples of the input of $1T_{max}$ in the false or "0" state, as will later be more fully described.

Referring more particularly to FIG. 2, the $\phi 1$ and $\phi 2$ clock phase signals over conductors 16 and 17 are shown in time relation in the top two lines of FIG. 2. The sync pulse $T_f$ is shown in its true and false states in line 3 of FIG. 2 while the start pulse $1R_{max}$ is shown in its true and false states in line 4 of FIG. 2. The output of the clear logic circuit 10 is shown in the fifth waveform line and the output $R_{max}$ is shown in its true and false states in the last line of FIG. 2. The flip-flop circuits used in this circuitry are known to consume substantially four microseconds to change from one state to the other and accordingly, this four microsecond time element is shown in the true $1R_{max}$ waveforms. By way of example, the recirculating shift register 15 was chosen to be 20 bits since it is manufactured in this number on silicon dies. With a clock shift rate of 250 kHz., the 20 bit shift register makes one complete shift cycle every 20-bit times or 80 microseconds. The shift cycle is therefore synchronous with the word sync pulse $T_f$ and the sync pulse $T_f$ is true during the 18th bit time and false during T19, T0, and T1 through T17. A very simple way of adding a one to the contents of the shift register can now be accomplished. Since $T_f$ is true only during T18 as shown in FIG. 2, the 18th bit time, a one-bit adder is used to add $T_f$ to the contents of the shift register 12. Thus a one is serially added to the contents of the shift register 12 during the time T18. Hence, the shift register 12 represents a 20 stage binary counter which is incremented by one every 80 microseconds. As hereinbefore stated, the K input lines are used to select the sampling rate (or pulse width) of the output waveform. The K lines represent a straight binary code whose least significant bit is K1. Once every 80 microseconds the contents of the counter is compared to the contents presented on the K lines for agreement. Once agreement is attained, the output waveform is returned to its logic "0" state or "off" state. The sampling rate is over the range of 500 microseconds to 500 milliseconds, inclusive. In order to minimize the number of input lines because of the pin constraint on the integrated package at the time, only a significant number of K lines are specified in order to select a sampling rate within the range that is required. For example, K3 through K13 lines carrying binary numbers, as shown in FIG. 1, are compared for agreement with the Y3 through Y13 stages, respectively. Since the contents on the Y counter represents a straight binary number, the weighting on the Y3 stage is $2^2$. Since the resolution of the least significant bit of the counter is 80 microseconds, the resolution of the Y3 stage is 320 microseconds. Therefore, using the eleven lines K3 through K13, inclusive, an appropriate range of 320 microseconds to 655 milliseconds can be selected in steps of 320 microseconds. For other applications where desirable, additional K lines may be added to extend the selectable range and/or for reducing the steps between selected variables to finer incremental steps such as 80 microseconds.

Figure 3:
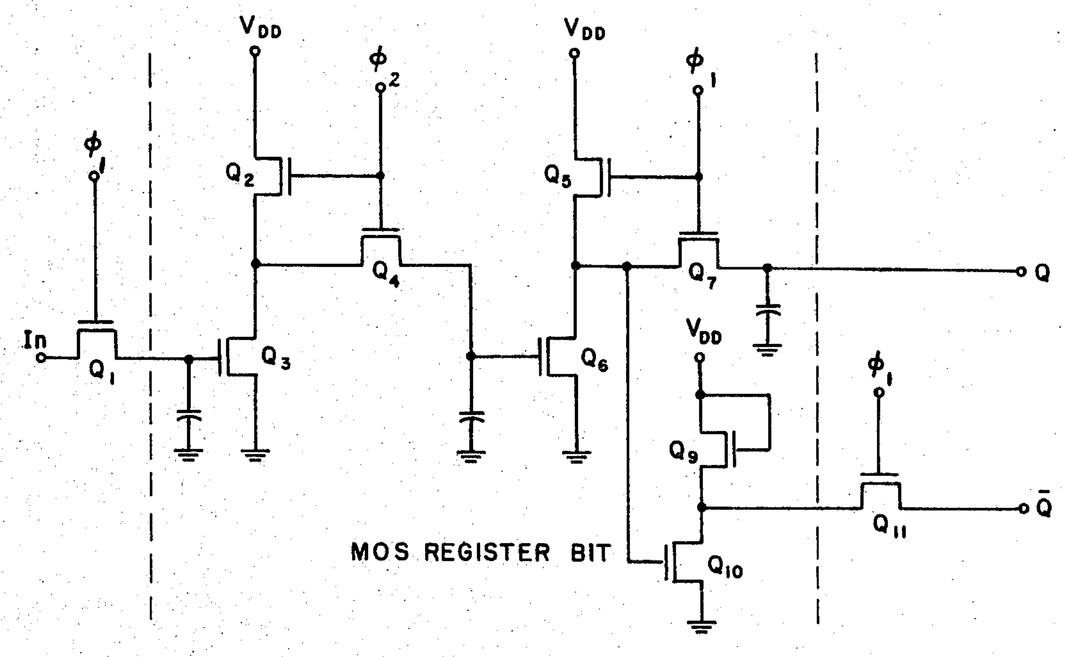
FIG. 3 is a circuit schematic of one MOS register bit as used in FIG. 1.

Referring more particularly to FIG. 3 there is shown a circuit schematic of a MOS register bit within the broken lines. This MOS register bit is of one known type and is illustrated herein only to insure completion of the disclosure although no invention is claimed in this particular circuit. The MOS transistors Q1 and Q2 are coupled as shown such that if the input signal from a preceding counter is false or "0," the output of transistor $Q_4$ will be "1" to produce an output Q of "0." Transistors $Q_2$, $Q_3$, and $Q_4$ constitute an inverter, and $Q_5$, $Q_6$, and $Q_7$ constitute an inverter, the two inverters producing a one-bit delay in any input signals at the input of $Q_1$ to the output signal Q on the output of $Q_7$. The transistors $Q_9$, $Q_{10}$, and $Q_{11}$ constitute an inverter circuit, as well understood by those skilled in the art, to produce the not Q output, or $\overline{Q}$ output. The one-bit delay circuits Y2 through Y20 only utilize the Q output in the shift register 12 while the Y1 one-bit delay utilizes both the Q and $\overline{Q}$ outputs as shown in FIG. 1. Accordingly, the MOS register bits are connected as shown in FIGS. 1 and 3 to produce the recirculating shift register 12 in FIG. 1.

OPERATION

In the operation of the device shown in FIG. 1 the multivibrators CL, C, X2, $R_{max}$, and $R_t$ all rest initially in their "0" state while the multivibrator X1 normally rests in its "1" state. The pilot depresses switch 41 momentarily to set X1 and reset X2 for the beginning of the sampling operation. The Y1 one-bit delay normally rests in its $\overline{Q}$ state in which a true signal is applied over the conductor 34 to the AND gate G5 and the reset terminal of the multivibrator C. With the multivibrator X1 in its "1" state a true signal will be applied over the output 47 constituting the signal $T_{max}$ indicating a true signal indication of the input $1T_{max}$.

Let it be assumed that the clock pulses $\phi 1$ and $\phi 2$ are applied over conductors 16 and 17 and at the precise time of the T18th $\phi$ signal the sync pulse $T_f$ and the $1R_{max}$ pulse are applied over the conductor means 21 and 22, respectively. Since the $R_t$ "0" output is in the true state, AND gate G2 will pass the sync pulse $T_f$ to the AND gate G1 to enable it to pass the $1R_{max}$ pulse. This causes the multivibrator CL to be set to the "1" state and at the same time the multivibrator C will be set to its "1" state since the sync pulse $T_f$ is directly coupled to the set terminal of C. Since the $1R_{max}$ signal is coupled by the conductor means 23 to the set terminal of the $R_{max}$ multivibrator, this will switch the $R_{max}$ multivibrator to produce a true signal on the output 36. At the same time, since G2 passed the sync pulse over the conductor 30 to AND gate G1, this pulse was likewise passed by the branch conductor 31 to the set terminal of the $R_t$ multivibrator placing the "0" output in the false state. The $T_f$ pulse over conductor 27 is operative to pass through AND gate G16 to set X2 in its "1" state since all three inputs to G16 are true signals, assuming $1T_{max}$ to be a false signal input in this example inverted by G13. When the sync pulse $T_f$ goes to its false state, the multivibrator C will be reset by virtue of the true state output of $\overline{Q}$ over the conductor 34. The clock pulses $\phi 1$ and $\phi 2$ will continue T1 through T20 to clear the shift register 12 since there are no true inputs to the shift register from the OR gate G6. G4 is closed since the Q input is false as well as the CL input. G5 is closed since the CL input is false. Upon the next succeeding $1R_{max}$ start pulse and $T_f$ sync pulse, gate G2 will be closed making the $1R_{max}$ start pulse ineffective to pass through gate G1 since there is no output signals on gate G2. Since CL is in its "1" state, a true input to gate G3 by conductor 29 is effective to pass the $T_f$ sync pulse by way of conductor 25 to the reset terminal of CL, resetting CL to its "0" state to produce a true signal on conductor 32. The sync pulse $T_f$ will also be applied to the set terminal of the multivibrator C for a 4 microsecond period opening gate G5. Since true states exist in all three inputs to G5, the $T_f$ sync pulse will be conducted therethrough and through OR gate G6 to the shift register 12 increasing the count by one in the shift register 12. Each succeeding sync pulse $T_f$ will therefore be applied to the set terminal of the multivibrator C producing another increment of one to the shift register 12 through AND gate G5 and OR gate G6. Shift register 12 will therefore continue to count upwardly until the outputs of the one-bit delay units compare in their output in the comparator circuit 13 with the K inputs which have been programmed into the system. For example, if K3 is a false signal and Y3 is a false signal, these two bits will be inverted in G7 and G8 to produce two true signals applied to the AND gate G10 which will be gated through OR gate G11 to the output AND gate G12. On the other hand, if K3 is a true signal and Y3 is a true signal, these will be gated through G9 and through the OR gate G11 to the output AND gate G12. A mismatch of the K3 and Y3 signals will block any signal to output AND gate 12. In this manner all true signals and false signals of the shift register 12 will be compared with the true signals and false signals of the binary input from the programmable K lines which, upon correspondence, will pass the like through AND gate G12 as a single true output signal to reset $R_{max}$ and $R_t$ multivibrators each to their "0" state. This will produce the trailing edge of the $R_{max}$ waveform shown in FIG. 2 which constitutes 80 microseconds plus 320 microseconds times the input number K plus the 4 microseconds operating time of the multivibrator. Since $R_t$ is now in the "0" state, the true signal output therefrom applied to gate G2 will again gate through the $1R_{max}$ and $T_f$ signals to set multivibrator CL to its "1" state removing the true input to the gate G4 from the CL "0" state whereupon gates G4 and G5 are closed applying no true input signals to the shift register 12. Again the $\phi 1$ and $\phi 2$ clock pulses will go through their 20 cycles to clear shift register 12.

If, for any reason, the comparator circuit 15 does not make a comparison to produce a true output on the output conductor 35 and the shift register 12 goes to its limit, the Y1 bit will shift its "0" true state from $\overline{Q}$ to the Q true output which is applied as a true input to the gate G4. If the output on gate G2 from the first sync pulse $T_f$ switches $R_t$ to its "1" state leaving the "0" state with a false output signal on conductor 28, multivibrator CL will be held in its true "0" state output and the multivibrator C will also remain in its "1" true output state to place a false "0" output to AND gate C4 to close the AND gate G4 to the CL "0" true state thereby applying false state signals to the shift register 12 clearing this register and returning the Y1 bit to its $\overline{Q}$ output. Succeeding sync pulses will again be added in the shift register as described hereinabove.

As hereinabove stated the first sync signal $T_f$ output through the AND gate G2 will be applied over the conductor means 31 to AND gates G15 and G18 and over conductor means 27 to G16 in the invalid data logic circuit 15 since X1 is resting in its "1" state and X2 is resting in its "0" state with an invalid signal of "0" or false content constituting the $1T_{max}$ signal applied through the inverter G13 to the AND gate G15 and to the AND gate G16. G16 will be opened to pass this pulse from the conductor 31 since all three inputs to G16 are in the true state, the first one being the true state from the "0" output of X2, the second being the inverted state of the $1T_{max}$ signal, and the third being the $T_f$ signal on conductor 27. This will shift X2 to its "1" state (as hereinbefore stated) producing a true signal on the output 45 to OR gate 19. Since X1 was already in its true state output, the output 47 will not change from its true state. Upon the occurrence of the second $T_f$ sync output through AND gate G2, X1 will be shifted to its "0" state since all three inputs on gate G15 are in the true state. This now places the four-state register in X1 in the "0" state and X2 in the "1" state keeping output 47 in the true state. The third succeeding $T_f$ sync pulse out of gate G2 over the conductor means 31 will shift X2 to its zero state by reason that AND gate G18 has true state signals on all three of its inputs. The first true input is the inverted $1T_{max}$ signal, the second true input is the G2 output, and the third true input is the "0" state output from X1. Thus, the $T_{max}$ output will return to a logic zero upon the occurrence of three consecutive invalid samples of $1T_{max}$ signals, otherwise the X1, X2 counter is normally set to its logic "1" state by a true $1T_{max}$ signal applied to OR gates G14 and G17 gating the true signals through to set X1 in its "1" state and to reset X2 in its "0" state. This sets the X1, X2 counter in the same state as though the switch 41 were momentarily closed. In this manner the invalid data logic circuit will indicate valid signals as long as the $T_{max}$ output remains in the "1" state but will indicate invalid signals whenever the $T_{max}$ output on conductor 47 returns to the "0" state after three sync samples.

As herein set forth above, output 36 will produce an output delay waveform of negative voltage as shown in the last line of FIG. 2 for the delay period established by the programmed K input to the comparator. At the same time the invalid data logic circuit will indicate whether valid or invalid signals are present.

While many modifications and changes may be made in the constructional details and features of this invention to provide the results conceived herein, it is to be understood that I desire to be limited in the spirit of my invention only by the scope of the appended claims.

I claim:

1. A programmable rate oscillator circuit comprising:

a MOS recirculating digital shift register having sync and clock inputs and an output for each digital bit;

a timing and control logic circuit having sync and clock outputs coupled to said corresponding shift register inputs and having inputs of start, sync, and clock pulses;

a digital comparator having a plurality of first inputs for a digital programming word and a plurality of second inputs coupled respectively to said digital bit outputs of said shift register, said digital comparator being constructed and arranged to produce an output when a programmed digital word on said first input corresponds to a digital word output from said shift register;

an output circuit of two states and two inputs, one input being coupled to said timing and control logic circuit to receive said start pulse to set said output circuit to one state and the other input being coupled to said output of said digital comparator to reset said output circuit to said other state, the time interval of said output circuit between states providing the delay pre-established by the programmed word input to said digital comparator;

an invalid data logic circuit having a four state counter controlled by a logic network, said logic network having an invalid data signal input and inputs coupled to said timing and control circuit to receive timing pulses to establish sampling times for said invalid data signals whereby output pulses from said output circuit are provided for a delay time programmed by said second input to said comparator circuit with voltage indications on the output of said invalid data logic circuit for valid and invalid input signals.

2. A programmable rate oscillator circuit as set forth in claim 1 wherein said timing and control logic circuit includes a clear logic circuit having said start, sync, and clock pulses applied thereto to produce a clear output signal coupled, together with said sync pulse, to a one-bit adder, said clear output signal and said sync pulse being logically selected to produce on said timing and control circuit output signals to reset said shift register to zero and to produce count.

3. A programmable rate oscillator circuit as set forth in claim 2 wherein said digital comparator includes units of two inverters, two AND gates, and one OR gate with one programmable input being to one each inverter and to one each AND gate and with the shift register bit input being to the other inverter and the other AND gate, the output of the AND gate being to said OR gate, and the outputs of all OR gates being to an output AND gate whereby when all inputs to said output AND gate are voltage signals of the same polarity, said output AND gate will pass an output voltage signal.

4. A programmable rate oscillator circuit as set forth in claim 3 wherein said output circuit includes two bistable multivibrators having the reset terminal thereof coupled in common to said comparator circuit output, the set terminal of one coupled to the input start signal, the set terminal of the other being coupled to said clear logic circuit to receive said start pulse, the "0" output of said other bistable multivibrator being coupled to said clear logic circuit, and the "1" output of said one bistable multivibrator being the output of said output circuit.

5. A programmable rate oscillator circuit as set forth in claim 4 wherein said invalid data logic circuit logic network includes first and second OR gates with the outputs thereof coupled respectively to the set and reset terminals of the four state counter, first, second, and third AND gates with the outputs of the first and second coupled respectively to the reset and set terminals of said four state counter, and an inverter, the OR and AND gates, and inverter circuit being coupled and arranged to sample the invalid data signals for each three consecutive sync pulses.

6. A programmable rate oscillator circuit as set forth in claim 5 wherein said clear logic circuit includes a bistable multivibrator and first, second, and third AND gate circuits, the first and third having outputs respectively to the set and reset terminals of said bistable multivibrator with said start pulse signals being applied as an input to said first AND gate and said sync pulse being applied as an input to said third AND gate, said reset terminal of said output circuit coupled to said clear logic circuit being coupled as one input to said second AND gate together with said sync pulse input, the "1" output of said bistable multivibrator being coupled as a second input to said third AND gate, and the output of said second AND gate being coupled as a second input to said first AND gate, to said input of said invalid data logic circuit, and to said set terminal of said other bistable multivibrator in said output circuit.

7. A programmable rate oscillator circuit as set forth in claim 6 wherein said one bit adder includes a multivibrator, first and second AND gates, and an OR gate, the set terminal of said bistable multivibrator being coupled to said sync pulse input of said clear logic circuit, said reset terminal of said multivibrator being coupled as one input of said second AND gate and to the shift register final bit, the "0" and "1" outputs of said multivibrator being coupled as inputs of said first and second AND gates respectively, and the output of the clear logic circuit being coupled as an input to said first AND gate, an output of said shift register being coupled as an input to said first AND gate, and the outputs of said AND gates being coupled as inputs to said OR gate with the OR gate output constituting said output to said shift register.

8. A programmable rate oscillator as set forth in claim 7 wherein said output AND gate has as one of its inputs said sync pulse from said timing and controlling circuit through a one-bit delay circuit.

References Cited

UNITED STATES PATENTS

| | | | |
|---|---|---|---|
| 3,002,151 | 9/1961 | Broderick et al. | 328—58 |
| 3,162,816 | 12/1964 | Rackoczi et al. | 328—63 |
| 3,267,295 | 8/1966 | Zuk | 307—221X |
| 3,322,974 | 5/1967 | Ahrons et al. | 307—221X |
| 3,358,236 | 12/1967 | Weber | 328—58 |

STANLEY T. KRAWCZEWICZ, Primary Examiner

U.S. Cl. X.R.

307—221, 265, 269, 279; 328—37, 58, 63, 74